Patented Apr. 25, 1944

2,347,626

UNITED STATES PATENT OFFICE 2,347,626

ASPHALTIC PRODUCT AND METHOD OF PREPARING SAME

Theodore F. Bradley, Stamford, Conn., assignor to American Cyanamid Company, New York, N. Y., a corporation of Maine No Drawing. Application May 6, 1941, Serial No. 392,184

7 Claims. (Cl. 106—273)

This invention relates to the hardening of asphalt and to the products so prepared.

The liquid petroleum residues of high boiling or relatively non-volatile character have limited usefulness. Most frequently they are hardened prior to use, and this is accomplished by heating the asphaltic material and blowing it with air.

By the present invention, there is provided a new class of asphalt derivatives having many unique characteristics. This is accomplished by reacting the asphaltic material with maleic anhydride in an amount ranging from about 1% to about 50%, the treatment being carried out at elevated temperatures, e. g., 150° to 250° C., until sufficient maleic anhydride is combined or the desired softening point has been reached.

In general, liquid, unsaturated asphaltic petroleum residues or partially oxidized modifications thereof are reacted with maleic anhydride to the desired degree. Any excess or unreacted maleic anhydride can be removed from the reaction mixture by extraction with water or other suitable solvents or by distillation with or without the use of vacuum, inert gases or steam during such distillation. The hardening effect of the maleic anhydride upon the asphalts is greater for oxidized (i. e., air blown) than for the unoxidized asphalts. The following data are typical of the reaction of maleic anhydride at varying percentages on blown and unblown Mexican asphalts at a temperature of 200° C. for two hours.

| Percent maleic anhydride used on weight of asphalt | A. S. T. M. ring and ball softening points, °C. | |
|---|---|---|
| | Blown | Unblown |
| 0 | 95 | 42.8 |
| 1 | 97.2 | 53.2 |
| 2 | 104.8 | |
| 5 | 122.2 | 58.4 |
| 10 | | 77 |
| 20 | | 88 |
| 35 | | 108 |
| 50 | | |

Similar or equivalent processes are applicable to other types of asphalts such as those of Venezuelan origin. The process may also be applied to the treatment of unsaturated fractions of asphalts, such fractions having been separated in any suitable manner. The reaction with the maleic anhydride serves to increase the melting point, hardness and industrial utility of petroleum asphalts or the fractions thereof to give a new class of asphaltic derivatives having many unique characteristics. These products are acidic and may be used to form salts and esters of innumerable types. These various materials are capable of many uses including the production of coating compositions or coatings, cold moldings, water-proofing compositions and the like.

The processes of treating the asphalts or fractions thereof are susceptible of many variations with respect to ratios, times and temperatures without departing from the spirit and scope of the invention as defined in the appended claims.

I claim:

1. The process of hardening asphaltic residues which comprises reacting maleic anhydride with an asphaltic petroleum residue containing unsaturated ingredients by heating a mixture of the same at about 150–250° C. until the softening point of the reaction product is substantially higher than that of the starting residue.

2. The process of hardening asphaltic residues which comprises reacting maleic anhydride with a partially oxidized asphaltic petroleum residue containing unsaturated ingredients by heating a mixture of the same at about 150–250° C. until the softening point of the reaction product is substantially higher than that of the starting residue.

3. The process of hardening asphaltic residues which comprises reacting maleic anhydride with an asphaltic petroleum residue containing unsaturated ingredients by heating a mixture of the same at about 150–250° C. until the softening point of the reaction product is substantially higher than that of the starting residue and removing unreacted maleic anhydride from the reaction product.

4. An asphaltic material comprising a reaction product of maleic anhydride with an unsaturated asphaltic petroleum residue, prepared by the process of claim 1.

5. An asphaltic material comprising a reaction product of maleic anhydride with an unsaturated, partially oxidized asphaltic petroleum residue, prepared by the process of claim 2.

6. An asphaltic material having an A. S. T. M. ring and ball softening point of about 53–108° C., prepared by reacting maleic anhydride with an unoxidized asphaltic petroleum residue.

7. An asphaltic material having an A. S. T. M. ring and ball softening point between about 104–122° C., prepared by the reaction of maleic anhydride on partially oxidized asphaltic petroleum residues.

THEODORE F. BRADLEY.